US012674027B2

(12) United States Patent
An et al.

(10) Patent No.: US 12,674,027 B2
(45) Date of Patent: Jul. 7, 2026

(54) POLYMERIZED HIGH-MOLECULAR-WEIGHT STERICALLY HINDERED AMINE AND PREPARATION METHOD THEREOF

(71) Applicant: BEIJING TIANGANG AUXILIARY CO., LTD., Beijing (CN)

(72) Inventors: Jingjing An, Beijing (CN); Wei Chen, Beijing (CN); Yongnian Gao, Beijing (CN); Jing Li, Beijing (CN); Gang Liu, Beijing (CN)

(73) Assignee: BEIJING TIANGANG AUXILIARY CO., LTD., Beijing (CN)

( * ) Notice: Subject to any disclaimer, the term of this patent is extended or adjusted under 35 U.S.C. 154(b) by 737 days.

(21) Appl. No.: 17/621,515

(22) PCT Filed: May 28, 2020

(86) PCT No.: PCT/CN2020/092974
§ 371 (c)(1),
(2) Date: Dec. 21, 2021

(87) PCT Pub. No.: WO2020/259195
PCT Pub. Date: Dec. 30, 2020

(65) Prior Publication Data

US 2022/0282044 A1 Sep. 8, 2022

(30) Foreign Application Priority Data

Jun. 25, 2019 (CN) ......................... 201910552502.8

(51) Int. Cl.
*C08G 73/06* (2006.01)

(52) U.S. Cl.
CPC ..... *C08G 73/0627* (2013.01); *C08G 73/0633* (2013.01); *C08G 73/0644* (2013.01)

(58) Field of Classification Search
None
See application file for complete search history.

(56) References Cited

U.S. PATENT DOCUMENTS 4,265,805 A 5/1981 Thomas
4,691,015 A * 9/1987 Behrens ............... C08K 5/3462 546/186
5,015,678 A 5/1991 Seltzer et al.
6,599,963 B2 7/2003 Horsey et al.
8,765,848 B2 7/2014 Fell et al.
2003/0153653 A1* 8/2003 Gugumus ............ C07D 487/18 524/95
2005/0014948 A1* 1/2005 Galbo ................. C07D 211/94 546/184
2005/0250884 A1* 11/2005 Nesvadba ................ C08F 4/00 524/99
2006/0128903 A1* 6/2006 Roth ..................... C08F 110/02 525/331.7
2007/0191427 A1* 8/2007 Merizzi ................... A61P 25/00 514/315
2011/0160453 A1 6/2011 Basbas et al.
2016/0222162 A1* 8/2016 Lutz ......................... H04K 1/00

FOREIGN PATENT DOCUMENTS

CN 1114653 A 1/1996
CN 1235159 A 11/1999
CN 1235612 A 11/1999
CN 1261904 A 8/2000
CN 1273241 A 11/2000
CN 1753871 A 3/2006
CN 101048378 A 10/2007
CN 101381471 A 3/2009
CN 101405306 A 4/2009
CN 101484423 A 7/2009
CN 101591331 A 12/2009
CN 102137889 A 7/2011
CN 102307940 A 1/2012
CN 102702174 A 10/2012
CN 102803262 A 11/2012
CN 104140556 A 11/2014

(Continued)

OTHER PUBLICATIONS

Song et al (Synthesis of thermally cleavable multisegmented polystyrene by an atom transfer nitroxide radical polymerization (ATNRP) mechanism, Polym. Chem., 2015, 6, 8060-8070). (Year: 2015).*
First Office Action; Chinese Patent Application No. 201910552502.8; mailed on Apr. 14, 2021, 30 pages (16 pages of Official copy and 14 pages of English translation).
Flory, Paul J., "Molecular Size Distribution in Three Dimensional Polymers. VI. Branched Polymers Containing A—R—Bf—1 Type Units", J. Am. Chem. Soc., vol. 74, No. 11, 1952, pp. 2718-2723.
International Search Report; PCT Patent Application No. PCT/CN2020/092974; mailed on Aug. 26, 2020; 8 pages (5 pages of Official copy and 3 pages of English translation).
Roy et al., "Convergent Synthesis of Digitally-encoded Poly(alkoxyamine amide)s", Chem. Commun., vol. 51, Dec. 31, 2015, pp. 15677-15680.

*Primary Examiner* — Rachel Kahn
(74) *Attorney, Agent, or Firm* — AEON Law, PLLC; Adam L.K. Philipp; Charlotte E Holoubek

(57) ABSTRACT

The present invention discloses a polymerized high-molecular-weight sterically hindered amine having a general formula I, the sterically hindered amine has the advantages of high molecular weight, difficult migration in polymer products, good thermal stability, etc., and can stabilize and/or be flame retardant to organic substances sensitive to light, heat or oxidation, and furthermore, can be made to have better compatibility with different types of polymer materials by changing substituents.

(I)

$$R_{12}-[A_1]_{m_1}-[A_2]_{m_2}-[A_3]_{m_3}-[A_4]_{m_4}-[A_5]_{m_5}-[A_6]_{m_6}-\cdots-[An]_{m_n}-R_{13}$$

6 Claims, No Drawings

(56) References Cited

FOREIGN PATENT DOCUMENTS

| | | | | | |
|---|---|---|---|---|---|
| CN | 105348525 | A | | 2/2016 | |
| CN | 105636954 | A | | 6/2016 | |
| CN | 109134928 | A | | 1/2019 | |
| EP | 782994 | B1 | | 2/2003 | |
| GB | 2347928 | A | * | 9/2000 | ............. B22C 11/10 |
| WO | 9900450 | A1 | | 1/1999 | |

* cited by examiner

POLYMERIZED HIGH-MOLECULAR-WEIGHT STERICALLY HINDERED AMINE AND PREPARATION METHOD THEREOF

CROSS-REFERENCE TO RELATED APPLICATIONS

This application is a U.S. National Phase entry of, and claims priority to, PCT International Phase Application No. PCTCN2020092974, filed May 28, 2020, which claims priority to Chinese Patent Application No. 201910552502.8, filed on Jun. 25, 2019. The entire contents of the above-referenced applications and of all priority documents referenced in the Application Data Sheet filed herewith are hereby incorporated by reference for all purposes.

FIELD

The present invention belongs to the field of polymer materials, and particularly relates to a polymerized high-molecular-weight sterically hindered amine and preparation method thereof, and the sterically hindered amine has beneficial effects in stabilizing the polymer and its blend against light and/or heat, and as a flame retardant for the polymer.

BACKGROUND

During the processing, storage, and use of polymer materials, there is a common phenomenon that their physical properties, chemical properties, and mechanical properties will gradually deteriorate. For example, yellowing, embrittlement, and cracking of plastics; stickiness, hardening, cracking, and insulation degradation of rubber; and discoloration, color fading, decrease in strength, and breakage of fiber products. These phenomena are collectively called aging or degradation of polymer materials. There are many factors that cause the aging of polymer materials, among which oxygen, light and heat have the most significant effects. In order to prevent or delay its aging and prolong its service life, people usually add chemical assistants with specific functions to polymer materials. Light stabilizers are a class of compounds that can interfere with the physicochemical process of photoinduced degradation of polymer materials, and are one of the most commonly used and important polymer material additives. Among them, hindered amine light stabilizers have attracted wide attention due to their excellent anti-aging effects and are one of the most active light stabilizers at home and abroad in the past two or three decades.

Hindered amine light stabilizers include: piperidine derivatives, imidazolone derivatives, and azacycloalkanone derivatives and other series. Piperidine derivatives have been researched more and developed fastest, and many varieties have been supplied to the market, such as Tinuvin 770, Chimassorb 944, UV-3346, Chimassorb 2020 (EP782994), Tiangang® HS-950, Tinuvin 292, Tinuvin 119, UV-3529, Tiangang® HS-625, Tinuvin 123, Tinuvin NOR 371 (CN101484423A), Flamestab NOR 116 (US20110160453A1), Tiangang® FR-810, etc.

In addition to the above commercialized products, researchers from various countries are also actively studying some hindered amine light stabilizers with new structures: patent document CN105636954A discloses a triazine, piperidine and pyrrolidyl hindered amine light stabilizer, patent document CN101048378A discloses a synthesis method for N-alkoxyamine, patent document CN102307940A discloses a N-substituted macrocyclic triazine hydrogen ALS stabilizer, patent document CN1753871A discloses water-compatible sterically hindered alkoxyamines and hydroxyl-substituted alkoxyamines, etc.

However, so far, hindered amine light stabilizers still have some shortcomings, such as low-molecular-weight hindered amine light stabilizers are volatile during polymer processing; hindered amine light stabilizers have relatively poor thermal stability, poor compatibility with polymer matrices, etc., which restricts the further application of the hindered amine light stabilizer.

In addition, more and more applications require polymer materials to have flame retardancy. Among them, the most widely used flame retardants are mainly bromine and phosphorus compounds. However, in order to achieve the flame retardant effect, the added amount of these flame retardants is high, which affects other properties of the polymer material; and in some thin products, even if the added amount of flame retardants is high, the flame retardant effect is still not achieved. In recent years, researchers found that in addition to being light stabilizers, alkoxy-substituted hindered amine light stabilizers can also be used as flame retardants.

Patents U.S. Pat. No. 6,599,963 and WO 99/00450 introduce the addition of hindered amine light stabilizers as flame retardants to polymer products. Patent WO 99/00450 points out that the hindered amine light stabilizer is not ideal in thin products (such as films or fibers) for the following reasons: on one hand, the color of the hindered amine light stabilizer causes discoloration of the final product; on the other hand, the hindered amine light stabilizer is easy to precipitate in polymer products owing to its relatively small molecular weight. Therefore, in order to overcome these disadvantages, it is urgent to develop a new type of alkoxy-substituted hindered amine light stabilizer, which can be used as both a light stabilizer and a flame retardant.

Patent U.S. Pat. No. 8,765,848 introduces grafting an alkoxy-substituted hindered amine onto a polyolefin wax to obtain a novel hindered amine light stabilizer. Such additives have high molecular weight, are not easy to precipitate, and have good compatibility with polyolefins. However, the grafting rate still cannot be controlled well, which affects its flame retardancy and light stability to polymer products; furthermore, since this type of hindered amine light stabilizer is grafted onto the polyolefin wax, it still has the disadvantage of poor compatibility with other types of resins.

In the present invention, the inventors obtained a polymerized high-molecular-weight sterically hindered amine by polymerizing a hindered amine light stabilizer. This novel sterically hindered amine has the advantages of high molecular weight, difficult to migrate out of polymer products, good thermal stability, etc., and can be made to have better compatibility with different types of polymer materials by changing substituents.

In addition, since the repeating units of the novel sterically hindered amine include a structure of

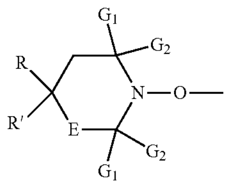

which functions to prevent aging and flame retardance, the novel sterically hindered amine has more efficient anti-aging properties and flame retardancy.

SUMMARY

The object of the present invention is to provide a polymerized high-molecular-weight sterically hindered amine; another object of the present invention is to provide a method for preparing the polymerized high-molecular-weight sterically hindered amine; another object of the present invention is to provide use of the polymerized high-molecular-weight sterically hindered amine; and further object of the present invention is to provide a composition including the polymerized high-molecular-weight sterically hindered amine and use thereof.

The present invention provides a polymerized high-molecular-weight sterically hindered amine, having a general formula I as follows:

(I)

$$R_{12}-[A_1]_{m_1}-[A_2]_{m_2}-[A_3]_{m_3}-[A_4]_{m_4}-[A_5]_{m_5}-[A_6]_{m_6}-\cdots-[An]_{m_n}-R_{13}$$

wherein $m_n$ represents the degree of polymerization of each monomer in the polymer, $m_n$ is an integer between 1-20; n is an integer between 1-20.

$A_1, A_2, A_3, A_4, A_5, A_6 \ldots A_n$ can be the same or different, and the $A_1, A_2, A_3, A_4, A_5, A_6 \ldots A_n$ structures are selected from a general formula II, III, IV or V, (II)

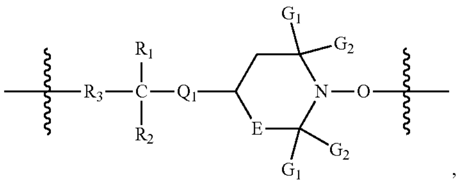

, (III)

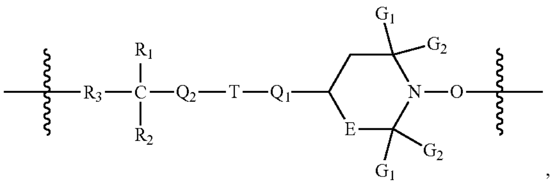

, (IV)

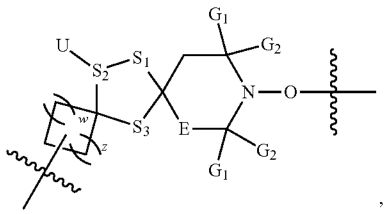

,

-continued (V)

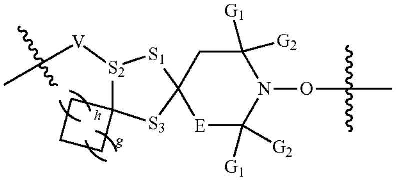

, wherein $G_1$ and $G_2$ can be the same or different, and are independently selected from $C_1$-$C_{18}$ alkyl, $C_2$-$C_{18}$ alkenyl, $C_2$-$C_{18}$ alkynyl, phenyl, $C_3$-$C_{12}$ cycloalkyl or $C_2$-$C_{12}$ heterocycloalkyl; or $G_1$, $G_2$ and the carbon atom between $G_1$ and $G_2$ form $C_3$-$C_{12}$ cycloalkyl, wherein any hydrogen atom on alkyl, alkenyl, alkynyl, phenyl, cycloalkyl or heterocycloalkyl can be substituted with hydroxyl, —$NO_2$, halogen, amino, cyano, —$R_{21}$, —$OR_{21}$, —$COOR_{21}$ or —$COR_{21}$, and a hetero atom in the heterocyclic ring can be oxygen, nitrogen, sulfur, phosphorus or silicon.

Preferably, $G_1$ and $G_2$ are independently selected from $C_1$-$C_4$ alkyl.

More preferably, $G_1$ and $G_2$ are independently selected from methyl.

The $R_{21}$ is selected from hydrogen, unsubstituted $C_1$-$C_{40}$ alkyl or $C_1$-$C_{40}$ alkyl substituted with $C_1$-$C_{18}$ alkyl, unsubstituted phenyl or phenyl with any hydrogen atom substituted with 1-3 —OH or $C_{1-30}$ alkyl groups, and unsubstituted $C_{7-9}$ phenylalkyl or $C_{7-9}$ phenylalkyl with any hydrogen atom of phenyl substituted with 1-3 —OH and $C_{1-30}$ alkyl groups.

Preferably, the $R_{21}$ is selected from $C_1$-$C_{20}$ alkyl.

More preferably, the $R_{21}$ is selected from $C_1$-$C_{12}$ alkyl.

E is selected from —CO— or —$(CH_2)_a$—, and a is selected from 0, 1 or 2, preferably, E is selected from —CO— or —$CH_2$—.

$R_1$ and $R_2$ can be the same or different, and are independently selected from hydrogen, $C_1$-$C_{50}$ alkyl, $C_3$-$C_{12}$ cycloalkyl, and $C_2$-$C_{12}$ heterocycloalkyl, wherein the H atom in the alkyl, cycloalkyl, or heterocycloalkyl can be substituted with hydroxyl, —$NO_2$, halogen, amino, cyano, —$R_{21}$, —$OR_{21}$, —$COOR_{21}$ or —$COR_{21}$, and the hetero atom in the heterocyclic ring can be oxygen, nitrogen, sulfur, phosphorus or silicon, and the value of $R_{21}$ is described above.

$R_3$ is selected from $C_1$-$C_{50}$ alkylene, $C_3$-$C_{12}$ cycloalkylene, and $C_2$-$C_{12}$ heterocycloalkylene, wherein the H atom in the alkylene, cycloalkylene, or heterocycloalkylene can be substituted with hydroxyl, $NO_2$, halogen, amino, cyano, —$R_{21}$, —$OR_{21}$, —$COOR_{21}$ or —$COR_{21}$, and the heteroatom in the heterocyclic ring can be oxygen, nitrogen, sulfur, phosphorus or silicon.

And, the total number of carbon atoms in $R_1$, $R_2$ and $R_3$ is 50 or less.

Preferably, the $R_1$ and $R_2$ are independently selected from hydrogen, and $C_1$-$C_{40}$ alkyl, wherein the H atom in the alkyl can be substituted with —$R_{21}$, —$OR_{21}$, —$COOR_{21}$ or —$COR_{21}$.

Preferably, the $R_3$ is selected from $C_1$-$C_{40}$ alkylene, wherein the H atom in the alkylene can be substituted with —$R_{21}$, —$OR_{21}$, —$COOR_{21}$ or —$COR_{21}$.

Preferably, the total number of carbon atoms in the $R_1$, $R_2$ and $R_3$ is 40 or less.

$Q_1$ and $Q_2$ can be the same or different, and are independently selected from —O—, —O—CO—O—, —CO—O—, —CO—$NR_{22}$—, —$NR_{22}$—, —$NR_{22}$—CO—$NR_{23}$— or —$(CH_2)_b$—, and b is 0, 1 or 2.

Preferably, the $Q_1$ and $Q_2$ are independently selected from —O—, —CO—O—, —CO—$NR_{22}$— or —$NR_{22}$—.

In the preferred embodiment of the invention, $Q_1$ and $Q_2$ are independently selected from —CO—O—, —CO—$NR_{22}$— or —$NR_{22}$—.

Wherein, the $R_{22}$ and $R_{23}$ are independently selected from hydrogen, unsubstituted $C_1$-$C_{40}$ alkyl or $C_1$-$C_{40}$ alkyl with any hydrogen atom substituted with $C_1$-$C_{18}$ alkyl, unsubstituted phenyl or phenyl with any hydrogen atom substituted with 1-3 —OH or $C_{1-30}$ alkyl groups, and unsubstituted $C_{7-9}$ phenylalkyl or $C_{7-9}$ phenylalkyl with any hydrogen atom of phenyl substituted with 1-3 —OH and $C_{1-30}$ alkyl groups.

Preferably, the $R_{22}$ and $R_{23}$ are independently selected from hydrogen, and $C_1$-$C_{20}$ alkyl.

More preferably, the $R_{22}$ and $R_{23}$ are independently selected from hydrogen, and $C_1$-$C_{12}$ alkyl.

The structural formula of T is selected from unsubstituted $C_1$-$C_{10}$ alkylene or $C_1$-$C_{10}$ alkylene with any H atom substituted with $C_1$-$C_5$ alkyl,

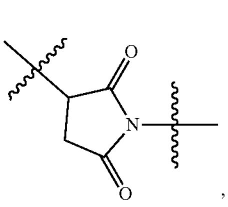

,

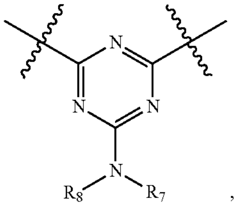

,

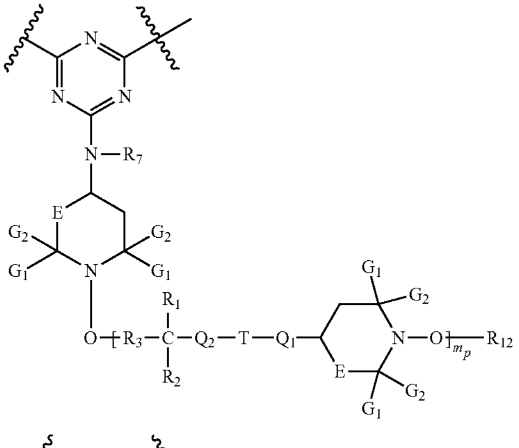

or

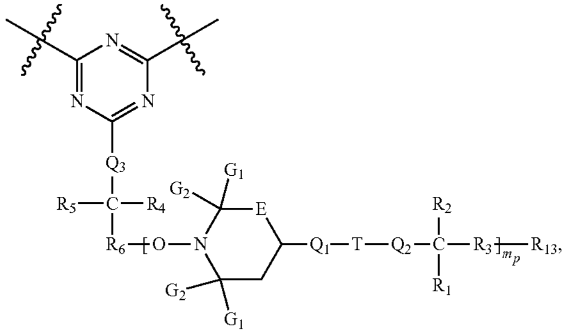

wherein when the structural formula of T is

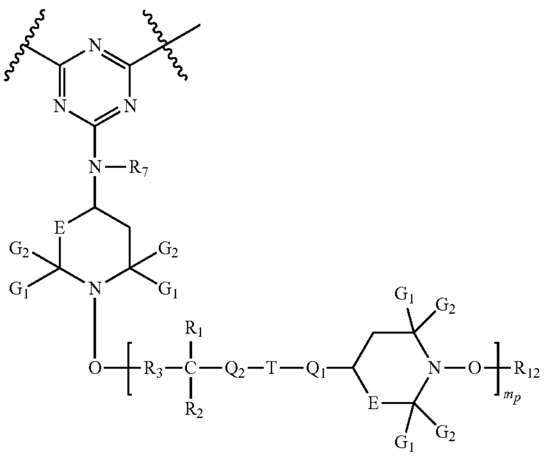

or

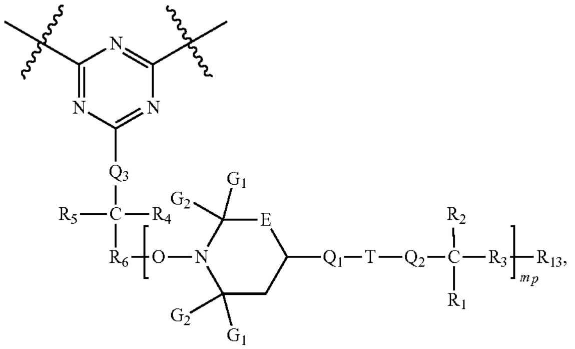

T in the structural formula is a repeatable unit, and the next T group is connected between $Q_1$ and $Q_2$;

$m_p$ is an integer between 1-20.

$R_7$ and $R_8$ can be the same or different, and are selected from hydrogen, $C_1$-$C_{40}$ alkyl, $C_3$-$C_{12}$ cycloalkyl, and $C_2$-$C_{12}$ heterocycloalkyl, wherein the H atom in the alkyl, cycloalkyl, or heterocycloalkyl can be substituted with hydroxyl, $NO_2$, halogen, amino, cyano, —$R_{21}$, —$OR_{21}$, —$COOR_{21}$ or —$COR_{21}$, and the hetero atom in the heterocyclic ring can be oxygen, nitrogen, sulfur, phosphorus or silicon.

Or, $R_7$, $R_8$ and the N atom between $R_7$ and $R_8$ form $C_3$-$C_{12}$ cycloalkylene, and $C_2$-$C_{12}$ heterocycloalkylene, wherein the H atom in the cycloalkylene, or heterocycloalkylene can be substituted with hydroxyl, $NO_2$, halogen, amino, cyano, —$R_{21}$, —$OR_{21}$, —$COOR_{21}$ or —$COR_{21}$, and the hetero atom in the heterocyclic ring can be oxygen, nitrogen, sulfur, phosphorus or silicon Preferably, the $R_7$ and $R_8$ are independently selected from hydrogen, unsubstituted $C_1$-$C_{20}$ alkyl or $C_1$-$C_{20}$ alkyl substituted with —$R_{21}$; or, $R_7$, $R_8$ and the N atom between $R_7$ and $R_8$ form unsubstituted $C_3$-$C_{12}$ cycloalkylene or $C_2$-$C_{12}$ heterocycloalkylene.

Preferably, the $C_2$-$C_{12}$ heterocycloalkylene is preferably $C_2$-$C_{12}$ oxo-heterocycloalkylene.

In the preferred embodiment of the invention, the $R_7$ and $R_8$ are independently selected from unsubstituted $C_1$-$C_{20}$ alkyl; or, $R_7$, $R_8$ and the N atom between $R_7$ and $R_8$ form unsubstituted $C_3$-$C_{10}$ cycloalkylene or $C_2$-$C_8$ oxo-cycloalkylene.

$Q_3$ is selected from —O—, —O—CO—O—, —CO—O—, —CO—$NR_{22}$—, —$NR_{22}$—, $NR_{22}$—CO—$NR_{23}$— or —$(CH_2)_b$—, and b is 0, 1 or 2.

Preferably, the $Q_3$ is selected from —O—, —CO—O—, —CO—$NR_{22}$— or —$NR_{22}$—.

In the preferred embodiment of the invention, $Q_3$ is independently selected from —$NR_{22}$—, the values of $R_{22}$, and $R_{23}$ are described above.

$R_4$ and $R_5$ can be the same or different, and are independently selected from hydrogen, $C_1$-$C_{50}$ alkyl, $C_3$-$C_{12}$ cycloalkyl, and $C_2$-$C_{12}$ heterocycloalkyl, wherein the H atom in the alkyl, cycloalkyl or heterocycloalkyl can be substituted with hydroxyl, —$NO_2$, halogen, amino, cyano, —$R_{21}$, —$OR_{21}$, —$COOR_{21}$ or —$COR_{21}$, and the hetero atom in the heterocyclic ring can be oxygen, nitrogen, sulfur, phosphorus or silicon, and the value of $R_{21}$ is described above.

$R_6$ is selected from $C_1$-$C_{50}$ alkylene, $C_3$-$C_{12}$ cycloalkylene, and $C_2$-$C_{12}$ heterocycloalkylene, wherein the H atom in the alkylene, cycloalkylene, or heterocycloalkylene can be substituted with hydroxyl, $NO_2$, halogen, amino, cyano, —$R_{21}$, —$OR_{21}$, —$COOR_{21}$ or —$COR_{21}$, and the hetero atom in the heterocyclic ring can be oxygen, nitrogen, sulfur, phosphorus or silicon.

And, the total number of carbon atoms in $R_4$, $R_5$ and $R_6$ is 50 or less.

Preferably, the $R_4$ and $R_5$ are independently selected from hydrogen, and $C_1$-$C_{40}$ alkyl, wherein the H atom in the alkyl can be substituted with —$R_{21}$, —$OR_{21}$, —$COOR_{21}$ or —$COR_{21}$.

Preferably, the $R_6$ is selected from $C_1$-$C_{40}$ alkylene, wherein the H atom in the alkylene can be substituted with —$R_{21}$, —$OR_{21}$, —$COOR_{21}$ or —$COR_{21}$.

Preferably, the total number of carbon atoms in the $R_4$, $R_5$ and $R_6$ is 40 or less.

$S_1$ is selected from —$CH_2$—, —CO— or —$NR_{24}$—; $S_2$ is selected from N or C; $S_3$ is selected from —O—, —$CH_2$—, —CO— or —$NR_{24}$—; $R_{24}$ is selected from hydrogen, $C_1$-$C_{50}$ alkyl, $C_3$-$C_{12}$ cycloalkyl, and $C_2$-$C_{12}$ heterocycloalkyl, wherein the H atom in the alkyl, cycloalkyl or heterocycloalkyl can be substituted with hydroxyl, —$NO_2$, halogen, amino, cyano, —$R_{21}$, —$OR_{21}$, —$COOR_{21}$ or —$COR_{21}$; the hetero atom in the heterocyclic ring can be oxygen, nitrogen, sulfur, phosphorus, or silicon;

w is selected from an integer between 1-20, and z is selected from an integer between 2-20.

Preferably, $S_1$ is selected from —$CH_2$—, and —CO—;

$S_2$ is selected from N;

$S_3$ is selected from —O—, —$CH_2$—, and —CO—;

w is selected from an integer between 1-7, and z is selected from an integer between 2-5.

U is selected from $R_{24}$ or

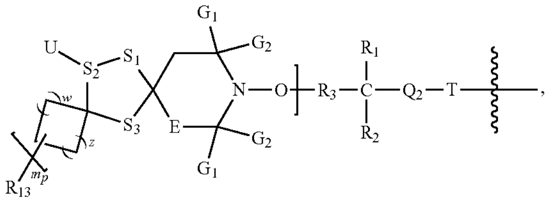

wherein when the structural formula of U is

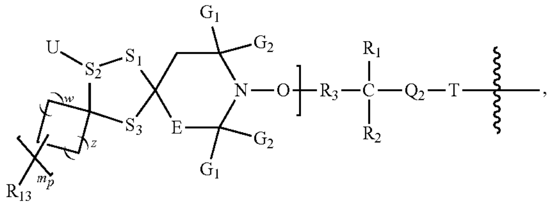

U in the structural formula is a repeatable unit, and the next U group is connected to $S_2$;

g is selected from an integer between 0-20, and h is selected from an integer between 1-20, V is selected from

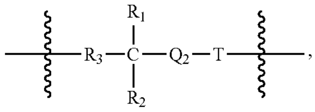

wherein the values of $Q_2$ and T are described above.

$R_{12}$ and $R_{13}$ are end-capping groups of the polymer, the $R_{12}$ and $R_{13}$ can be the same or different, and are independently selected from hydrogen, unsubstituted $C_4$-$C_{30}$ alkyl or $C_4$-$C_{30}$ alkyl with any H atom substituted with hydroxyl, —$NO_2$, halogen, amino, cyano, —$R_{21}$, —$OR_{21}$, —$COOR_{21}$, —$COR_{21}$ or $C_1$-$C_{10}$ alkyl, unsubstituted phenyl or phenyl with any H atom substituted with hydroxyl, —$NO_2$, halogen, amino, cyano, —$R_{21}$, —$OR_{21}$, —$COOR_{21}$, —$COR_{21}$ or $C_{1\text{-}30}$ alkyl, and unsubstituted $C_{7\text{-}9}$ phenylalkyl or $C_{7\text{-}9}$ phenylalkyl with any H atom of phenyl substituted with hydroxyl, —$NO_2$, halogen, amino, cyano, —$R_{21}$, —$OR_{21}$, —$COOR_{21}$, —$COR_{21}$ or $C_{1\text{-}30}$ alkyl,

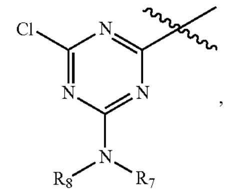
,
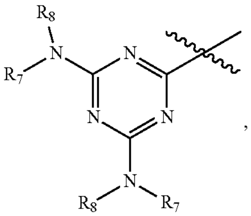
,
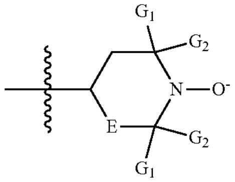
or
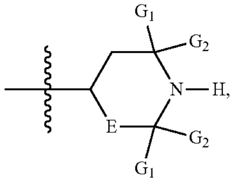

wherein the values of $R_7$ and $R_8$ are described above.

Preferably, the $R_{12}$ and $R_{13}$ are independently selected from hydrogen, unsubstituted $C_4$-$C_{30}$ alkyl or $C_4$-$C_{30}$ alkyl with any H atom substituted with hydroxyl, —$NO_2$, halogen, amino, cyano, —$R_{21}$, —$OR_{21}$, —$COOR_{21}$, —$COR_{21}$ or $C_1$-$C_{10}$ alkyl, and cyanuro substituted with two —$NR_7R_8$.

Most preferably, the $R_{12}$ and $R_{13}$ are independently selected from hydrogen, unsubstituted $C_4$-$C_{30}$ alkyl or $C_4$-$C_{30}$ alkyl with any H atom substituted with hydroxyl, —$NO_2$, halogen, amino, cyano, —$R_{21}$, —$OR_{21}$, —$COOR_{21}$, —$COR_{21}$ or $C_1$-$C_{10}$ alkyl.

In the preferred embodiment of the invention, the $A_1$, $A_2$, $A_3$, $A_4$, $A_5$, $A_6$ . . . $A_n$ is selected from the following structural formulas:

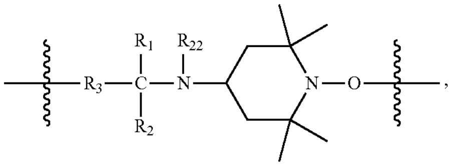

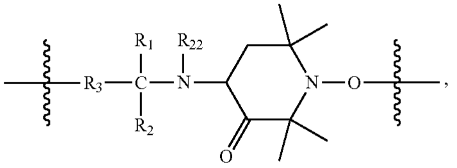

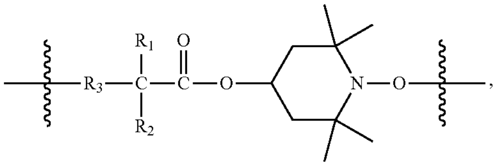

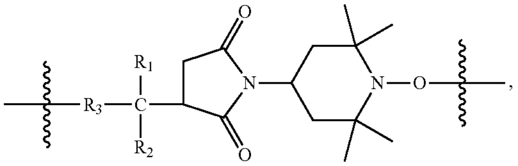

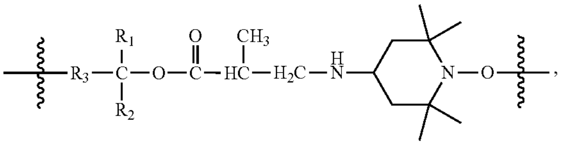

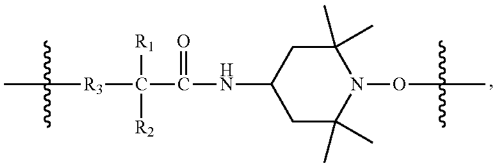

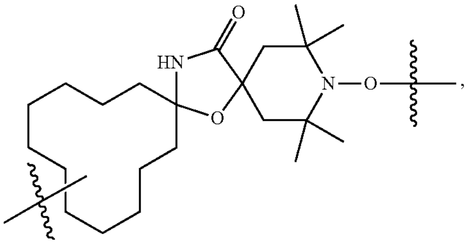

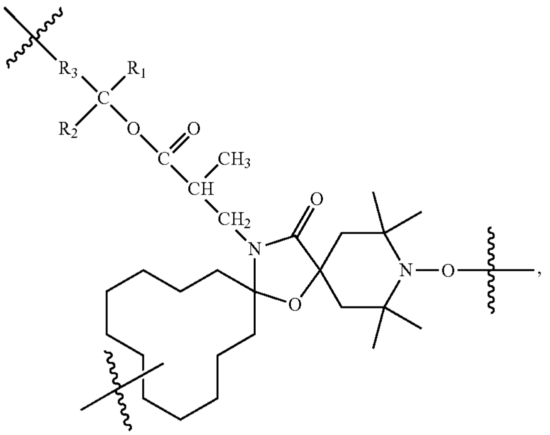

-continued

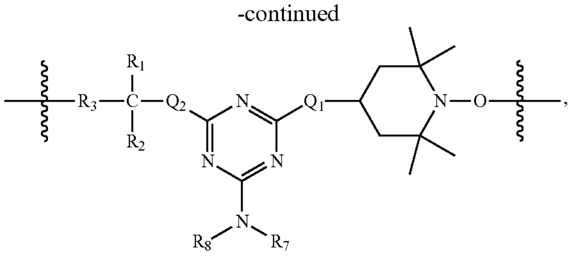

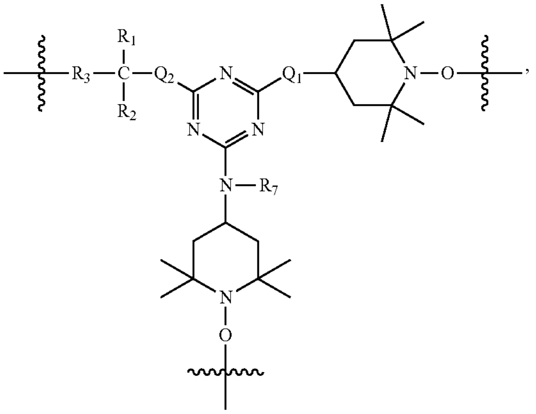

and

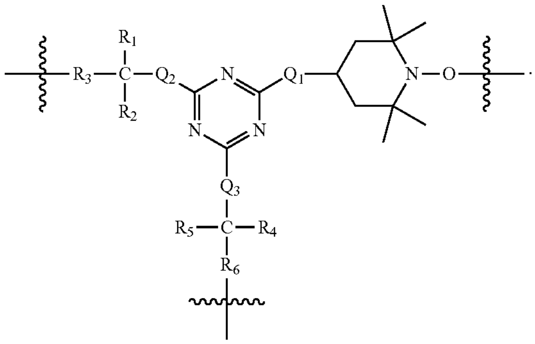

In the present invention, the carbon chain of greater than or equal to 4 C atoms generates an activation site under the action of a catalyst, and reacts with O connected to a piperidine ring. As shown above, when the monomer has two polymerization sites, a linear polymer is formed, and when the monomer has three polymerization sites, all three sites can polymerize to form a hyperbranched polymer. The hyperbranched polymer according to the present invention is a highly branched polymer formed by the polycondensation reaction of $AB_X$ (X=2) type monomers. This polymer is not a perfect dendrimer and is a polymer in a specific polymerization form, called hyperbranched polymers. A and B are functional groups having a linking function, respectively. As described in the non-patent document "Flory, P. J. *J. Am*, Chem. Soc. 1952, 74,2718.", the concept of hyperbranched polymers was proposed at the end of the 19th century and so far, is still widely studied.

Therefore, in the preferred embodiment of the invention, the polymerized high-molecular-weight sterically hindered amine of the general formula I can be selected from the following polymerized forms:

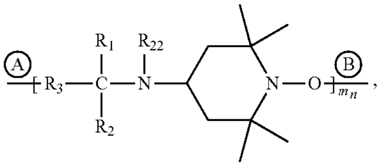
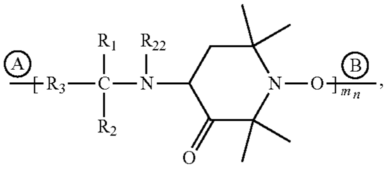
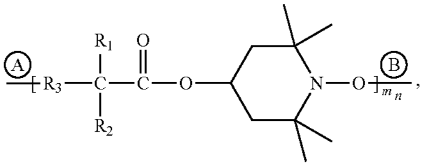
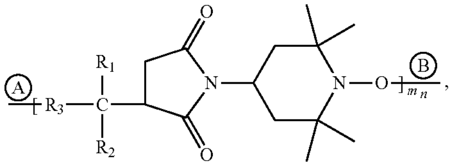
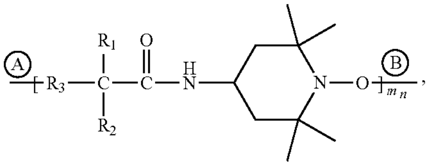
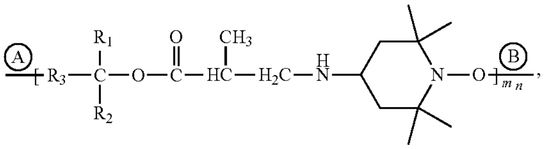
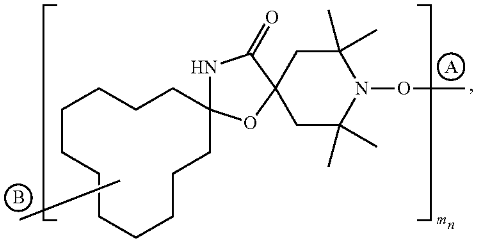
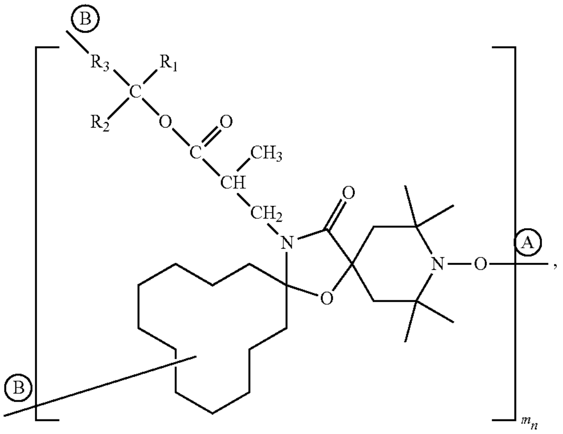
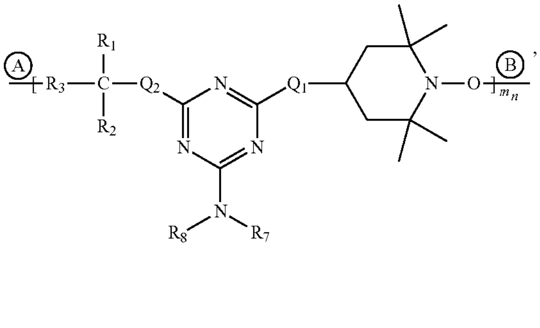
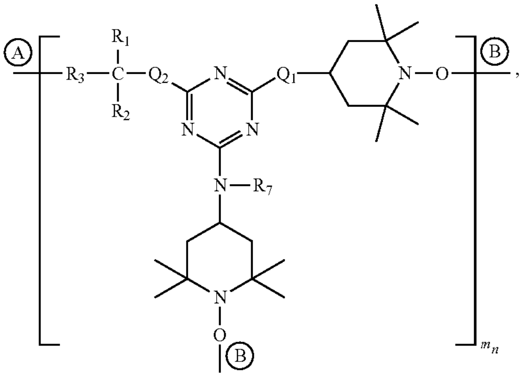
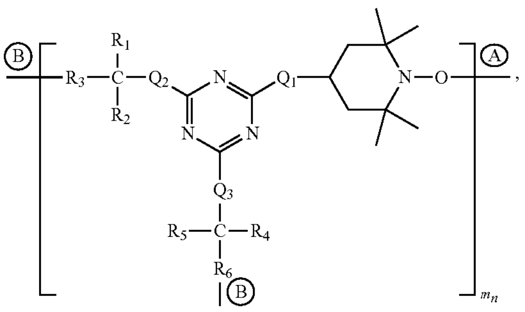

-continued

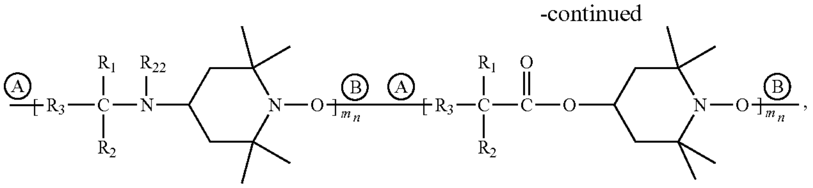

,

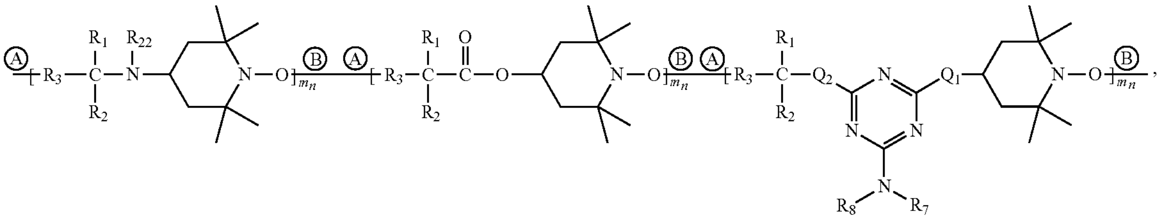

,

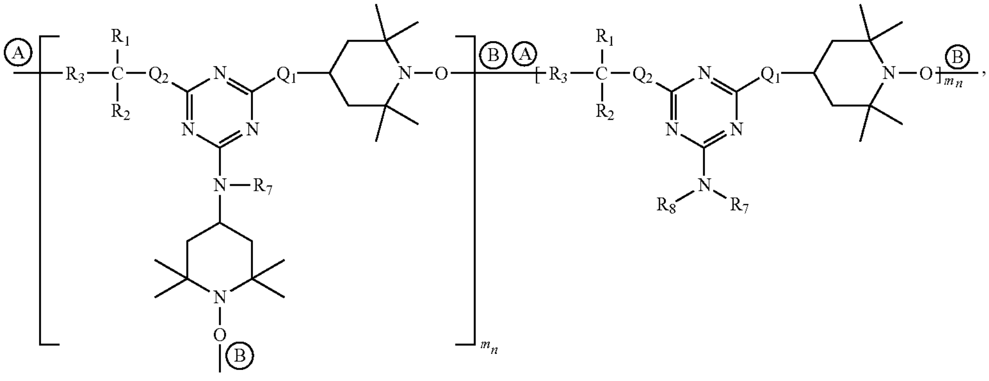

, wherein Ⓐ and Ⓑ represent polymerizable sites, and the Ⓐ site can polymerize with the Ⓑ site, when AB is polymerized in the polymer, a linear polymer is formed, simply expressed as A-B-A-B; when $AB_2$ is polymerized in the polymer, a hyperbranched polymer is formed, simply expressed as a structure like the right

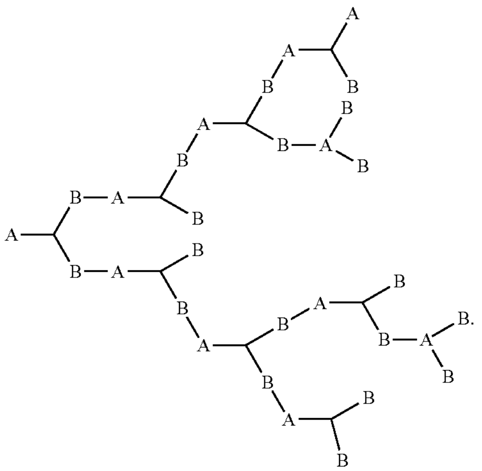

Or, in the preferred embodiment of the invention, the polymerized high-molecular-weight sterically hindered amine of the general formula I can also be selected from the following polymerized forms:

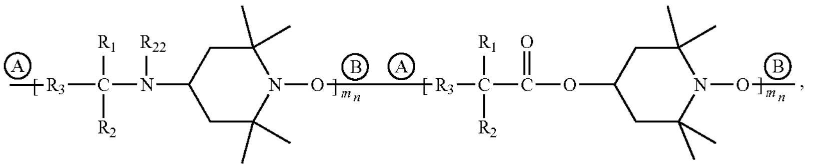

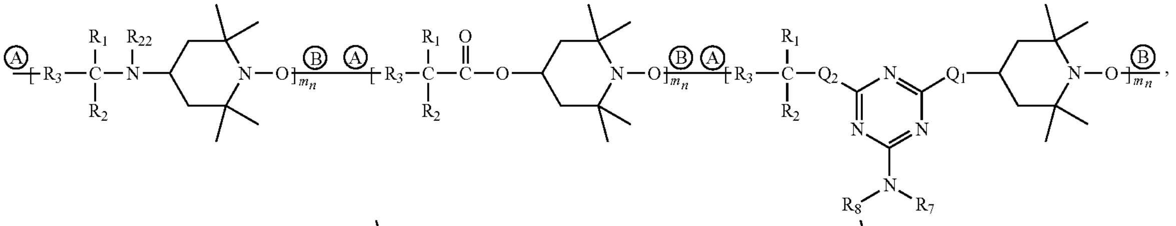

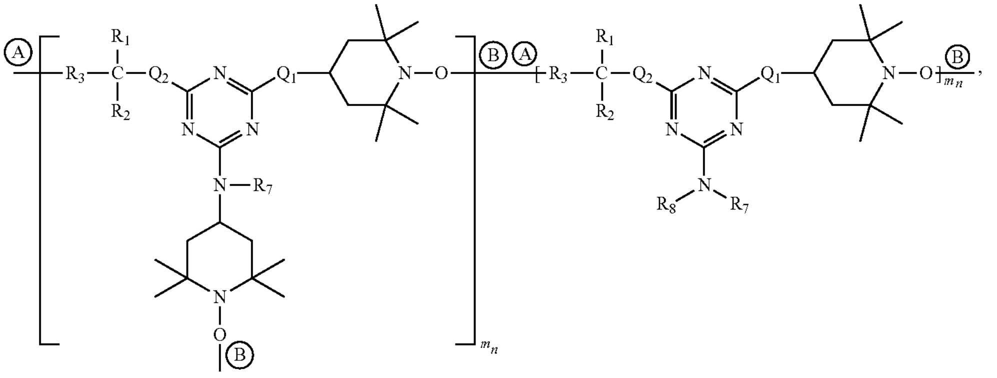

In the above polymerization form, $m_n$ represents the polymerization degree of each monomer of the polymer, which can be the same or different, and $m_n$ is an integer between 1-20.

Preferably, $R_1$ and $R_2$ are independently selected from hydrogen or $C_1$-$C_{40}$ alkyl; $R_3$ is selected from $C_1$-$C_{40}$ alkylene; the total number of carbon atoms in $R_1$, $R_2$ and $R_3$ is 40 or less.

$R_{22}$ is selected from $C_1$-$C_5$ alkyl.

$R_7$ and $R_8$ are independently selected from $C_1$-$C_{10}$ alkylene or $R_7$, $R_8$ and the N atom between $R_7$ and $R_8$ form $C_3$-$C_{10}$ cycloalkylene and $C_2$-$C_8$ oxo-cycloalkylene.

$R_4$ and $R_5$ are independently selected from hydrogen or $C_1$-$C_{40}$ alkyl; $R_6$ is selected from $C_1$-$C_{40}$ alkylene; the total number of carbon atoms in $R_4$, $R_5$ and $R_6$ is 40 or less.

$Q_1$ and $Q_2$ are independently selected from —CO—O—, —CO—$NR_{22}$— or —$NR_{22}$—, and $R_{22}$ is selected from $C_1$-$C_5$ alkyl.

In the present invention, the term alkyl includes carbon atoms within a given range, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, and 1,1,3,3,5,5-hexamethylhexyl.

Examples of alkenyl are the following within a given carbon atom range: vinyl, allyl and branched and linear isomers of butenyl, pentenyl, hexenyl, heptenyl, octenyl, nonenyl, decenyl, undecenyl and dodecenyl, the term alkenyl also includes groups having one or more conjugated or non-conjugated double bonds, which can, for example, contain one double bond.

Some examples of cycloalkyl are cyclopropyl, cyclobutyl, methylcyclobutyl, cyclopentyl, methylcyclopentyl, dimethylcyclopentyl, trimethylcyclopentyl, ethylcyclopentyl, propylcyclopentyl, isopropylcyclopentyl, cyclohexyl, methylcyclohexyl, dimethylcyclohexyl, ethylcyclohexyl, cycloheptyl, methylcycloheptyl, and cyclooctyl.

Examples of heterocycloalkyl are cycloalkyl containing elements such as N, O, S, Si, and the like.

Examples of alkylene are the following within a given carbon atom range: branched and linear isomers of ethylidene, propylidene, isopropylidene, butylidene, sec-butylidene, isobutylidene, 2-ethylbutylidene, pentylidene, isopentylidene, 1-methylpentylidene, 1,3-dimethylbutylidene, hexylidene, 1-methylhexylidene, heptylidene, 1,1,3,3-tetramethylbutylidene, 1-methylheptylidene, 3-methylheptylidene, octylidene, 2-ethylhexylidene, 1,1,3-trimethylhexylidene, 1,1,3,3-tetramethylpentylidene, nonylidene, decylidene, undecylidene and dodecylidene.

The $C_{7-9}$ phenylalkyl according to the present invention is preferably benzyl and 2-phenethyl.

The $C_{7-9}$ phenylalkyl substituted with 1-3 $C_{1-4}$ alkyl according to the present invention is preferably methylbenzyl, dimethylbenzyl, trimethylbenzyl or tert-butyl benzyl.

The present invention provides a method for preparing the polymerized high-molecular-weight sterically hindered amine having the general formula I, including the steps:

dissolving a polymerizable monomer in a solvent or heating a polymerizable monomer to a molten state, adding a catalyst and hydroperoxide in sequence, and carrying out a reaction to generate the polymerized high-molecular-weight sterically hindered amine having the general formula I, wherein the polymerizable monomer has the general formula as follows:

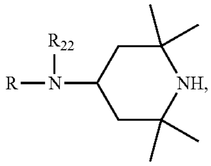

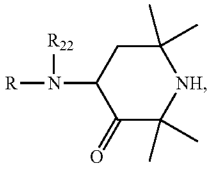

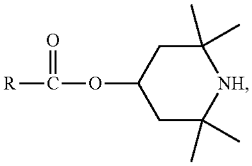

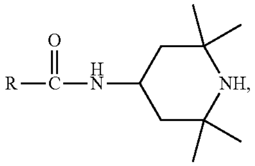

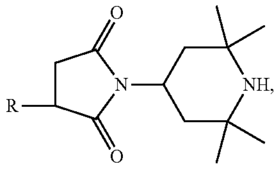

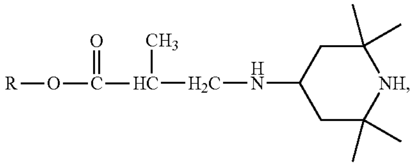

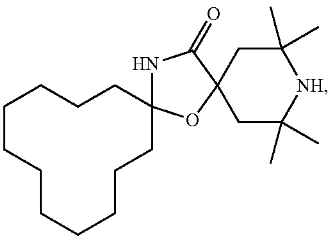

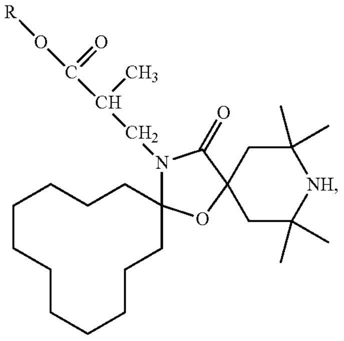

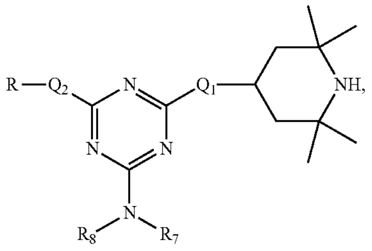

-continued

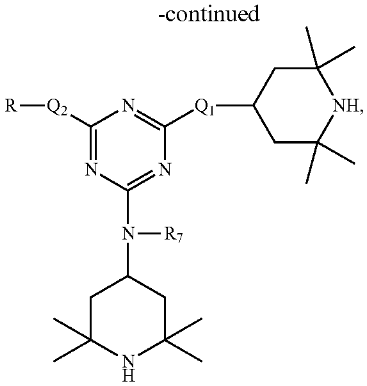

and

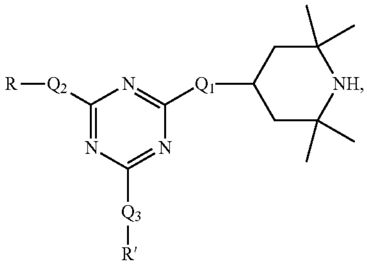

wherein,

R and R' can be the same or different, and are selected from $C_1$-$C_{50}$ alkyl, $C_3$-$C_{12}$ cycloalkyl, and $C_2$-$C_{12}$ heterocycloalkyl, wherein the H atom in the alkyl, cycloalkyl, or heterocycloalkyl can be substituted with hydroxyl, $NO_2$, halogen, amino, cyano, —$R_{21}$, —$OR_{21}$, —$COOR_{21}$ or —$COR_{21}$, and the hetero atom in the heterocyclic ring can be oxygen, nitrogen, sulfur, phosphorus or silicon; and the total number of carbon atoms in R and R' is 50 or less; the values of other parameters in the general formula are as described above.

The polymerizable monomers shown above are known in the art, some of which are commercially available or can be synthesized according to methods known in the art.

The solvents used in the method of the present invention are common organic solvents such as aromatic hydrocarbons (such as benzene, dichlorobenzene, chlorobenzene, etc.), halogenated hydrocarbons, alcohols (such as methanol, ethanol, ethylene glycol or methyl ether) or water.

Preferably, the solvent is an aromatic hydrocarbon solvent such as benzene, dichlorobenzene, and chlorobenzene.

The reaction temperature in the method of the present invention is 0-250° C., preferably 25-100° C., and more preferably 45-150° C.

The catalyst used in the method of the present invention is a metal compound, wherein the metal in the metal compound is selected from IVb, Vb, VIb, VIIb and VIII metal elements in the periodic table.

Preferably, the metal compound is selected from vanadiumoxy acetylacetonate, vanadium (III) acetylacetonate, cobalt carbonyl, chromium (VI) oxide, n-butyl titanate, isopropyl titanate, hexacarbonyl molybdenum, molybdenum trioxide, vanadium pentoxide, chromium trioxide and/or tungsten trioxide.

In a preferred embodiment of the present invention, the metal compound is molybdenum trioxide, vanadium pentoxide, chromium trioxide, and/or tungsten trioxide.

The amount of the catalyst used in the present invention is 0.0001-0.6 molar equivalent, preferably 0.01-0.3 molar equivalent, more preferably 0.01-0.15 molar equivalent, based on the molar equivalent of the polymerizable monomer.

The hydroperoxide used in the method of the present invention is an inorganic hydroperoxide or an organic hydroperoxide.

Preferably, the inorganic hydroperoxide is $H_2O_2$; the organic hydroperoxide is an alkyl hydroperoxide and an aryl hydroperoxide.

Preferably, the alkyl hydroperoxide is a tertiary alkyl hydroperoxide, such as tert-butyl hydroperoxide, tert-amyl hydroperoxide, tert-hexyl hydroperoxide or tert-octyl hydroperoxide; the aryl hydroperoxide is ethylbenzene hydroperoxide, tetrahydronaphthalene peroxide or cumene hydroperoxide.

In a preferred embodiment of the present invention, the hydroperoxide is selected from $H_2O_2$, t-butyl hydroperoxide or cumene hydroperoxide.

The amount of hydroperoxide used in the present invention is 1-20 molar equivalents, preferably 1-10 molar equivalents, more preferably 1-5 molar equivalents, based on the molar equivalent of the polymerizable monomer.

The method of the present invention is performed in an inert atmosphere such as nitrogen, helium or argon. The method of the present invention can be performed at 0.5-30 bar, preferably 0.5-20 bar, especially 0.5-10 bar, and can also be performed under ambient pressure.

The present invention provides use of the polymerized high-molecular-weight sterically hindered amine having the general formula I as a stabilizer and/or a flame retardant.

Preferably, the polymerized high-molecular-weight sterically hindered amine having the general formula I can stabilize and/or be flame retardant to organic substances sensitive to light, heat or oxidation.

The present invention provides a composition including one or more organic substances sensitive to light, heat or oxidation and at least one polymerized high-molecular-weight sterically hindered amine having the general formula I.

Preferably, the composition further includes one or a combination of two or more of an antioxidant, a UV absorber, a hindered amine light stabilizer, a reinforcing agent, a filler, a flame retardant or other additives. The other additives are selected from plasticizers, lubricants, emulsifiers, pigments, rheological additives, catalysts, flow control agents, optical brighteners, refractory agents, antistatic agents and foaming agents.

Preferably, in the composition, the amount of the polymerized high-molecular-weight sterically hindered amine having the general formula I is determined by the organic substance properties, end use and additives, and the polymerized high-molecular-weight sterically hindered amine having the general formula I can be used in various ratios.

Preferably, the amount of the polymerized high-molecular-weight sterically hindered amine having the general formula I is 0.01%-5% of the weight of the organic substance;

- more preferably, the amount of the polymerized high-molecular-weight sterically hindered amine having the general formula I is 0.05%-2% of the weight of the organic substance;
- most preferably, the amount of the polymerized high-molecular-weight sterically hindered amine having the general formula I is 0.05%-1% of the weight of the organic substance.

The organic substance is selected from: one or a combination of two or more of polyolefin, acrylonitrile/butadiene/styrene, polyvinyl chloride, polymethyl methacrylate, polyacetal, polyamide, polyimide, epoxy resin, polyurethane, polycarbonate, polyurethane, polyester, polysulfone, polyurea, polystyrene, thermoplastic elastomer, and ethylene-vinyl acetate copolymer.

The polyolefin is selected from: polyethylene or polypropylene with a rubber phase based on ethylene and/or propylene. The polyacetal includes polyoxymethylene, polyoxymethylene containing ethylene oxide as a comonomer, and polyacetal modified with thermoplastic polyurethane, acrylate or MBS.

The polyamide includes polyamides and copolyamides derived from diamines and dicarboxylic acids and/or aminocarboxylic acids or corresponding lactams, for example, polyamide 4, polyamide 6, polyamide 66, polyamide 610, polyamide 69, polyamide 612, polyamide 46, polyamide 1212, polyamide 11, and polyamide 12, aromatic polyamides obtained from m-xylene diamine and adipic acid; polyamide obtained from hexamethylene and isophthalic acid or/and terephthalic acid in the presence or absence of an elastomer as a modifier.

The polyester includes polyester derived from a dicarboxylic acid and a diol and/or a hydroxycarboxylic acid or a corresponding lactone thereof, for example, polyethylene terephthalate, polybutylene terephthalate, poly 1,4-dimethylolcyclohexane terephthalate, and polyhydroxybenzoate, as well as block copolyetheresters of hydroxyl terminated polyether derivatives, and polyester modified with polycarbonate or MBS.

The thermoplastic elastomer includes a polyolefin thermoplastic elastomer and a block copolymer type polystyrene thermoplastic elastomer. Polyolefin thermoplastic elastomers include polyolefin resins (such as polyethylene and polypropylene serving as hard segments) and rubber compositions (such as ethylene-propylene-diene elastomers (EPDM) serving as soft segments). The block copolymer type polystyrene thermoplastic elastomer includes polystyrene serving as a hard segment and polydiene (such as polybutadiene or polyisoprene) serving as a soft segment.

Alternatively, a blend of a polyolefin elastomer and a polystyrene elastomer can be used as the thermoplastic elastomer of the present invention. Methods for combining soft and hard segments in thermoplastic elastomers can be broadly divided into simple blending, implantation through copolymerization, and dynamic cross-linking. The combination of polystyrene thermoplastic elastomer segments includes SBS, SIS, SEBS, SEPS, hydrogenated polymers of any one of these four copolymers, SBR hydrogenated polymers (HSBR), and blends of polypropylene with one or more any members selected from these polymers.

The antioxidant is selected from: phenol and/or amine antioxidants, phosphites, thioesters, etc. Preferred are an antioxidant 1010, an antioxidant 1076, an antioxidant 1098, an antioxidant 168, etc.

The UV absorber is selected from: salicylates, benzoates, benzophenones, benzotriazoles, and triazines.

The hindered amine light stabilizer is selected from: a hindered amine light stabilizer having a different structure from the compound of the present invention or a mixture thereof, such as bis(2,2,6,6-tetramethyl-4-piperidinyl)sebacate, a polymer of succinic acid with 4-hydroxy-2,2,6,6-tetramethyl-1-piperidine ethanol, Chimassorb 944, Chimassorb 2020, UV-3346, UV-3529, Tinuvin 770, Tinuvin 622LD, Tinuvin 292, Tiangang® HS-625, Tiangang® HS-950, etc.

The filler and reinforcing agent are selected from: calcium carbonate, silicate, glass fiber, glass beads, asbestos, talc, kaolin, mica, barium sulfate, metal oxides and hydroxides, carbon black, graphite, wood flour and flour or other natural product fibers, synthetic fibers.

The present invention provides use of the composition for preparing any polymer material products, wherein the polymer material such as plastics, coatings, adhesives, etc., is selected from the fields of car interior or exterior decorative materials, floating devices, road traffic devices, agricultural products, electrical appliances, furniture, footwear, sanitary products and health products.

The plastic product can be manufactured by any method known to those having ordinary skill in the art, including, but not limited to, extrusion, extrusion blow molding, film casting, calendering, injection molding, blow molding, compression molding, thermoforming, spin forming, blow extrusion and rotary casting.

DETAILED DESCRIPTION OF THE EMBODIMENTS

The technical solutions in the examples of the present invention will be clearly and completely described below, Obviously, the described examples are only some of the examples of the present invention, but not all of examples. Based on the examples of the present invention, all other examples obtained by a person of ordinary skill in the art without creative efforts shall fall within the protection scope of the present invention.

Example 1

81 g of 2,2,6,6-tetramethyl-4-piperidinedodecylamine and 2 g of molybdenum trioxide were dissolved in 400 mL chlorobenzene, and heated to 120° C., then 60 g of tert-butyl hydroperoxide (a 70% aqueous solution) was slowly added dropwise, and the mixture was stirred continuously for 12 h. After the reaction was completed, excess saturated sodium sulfite solution was added, and the mixture was stirred, subjected to phase separation, and filtered, and the organic phase was concentrated to obtain 60 g of the target product.

Molecular weight: 1650 (Mn)

Dynamic viscosity (140° C.): 152 mPas

Example 2

81 g of 2,2,6,6-tetramethyl-4-piperidinedodecylamine and 1 g of molybdenum trioxide were dissolved in 400 mL chlorobenzene, and heated to 140° C., then 35 g of tert-butyl hydroperoxide (a 70% aqueous solution) was slowly added dropwise, and the mixture was stirred continuously for 48 h. After the reaction was completed, excess saturated sodium sulfite solution was added, and the mixture was stirred, subjected to phase separation, and filtered, and the organic phase was concentrated to obtain 70 g of the target product.

Molecular weight: 1850 (Mn)

Dynamic viscosity (140° C.): 178 mPas

Example 3

81 g of 2,2,6,6-tetramethyl-4-piperidinedodecylamine and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 75 g of the target product.

Molecular weight: 2028 (Mn)

Dynamic viscosity (140° C.): 232 mPas

Example 4

85 g of N-dodecyl-2,2,6,6-tetramethylpiperazinone and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 77 g of the target product.

Molecular weight: 1950 (Mn)

Dynamic viscosity (140° C.): 241 mPas

Example 5

106 g of 2,2,6,6-tetramethyl-4-piperidinyl stearate and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 90 g of the target product.

Molecular weight: 2080 (Mn)

Dynamic viscosity (140° C.): 267 mPas

Example 6

(1) 36.9 g of cyanuric chloride was dissolved in 300 mL xylene, and cooled to 10° C., 42.4 g of N-(2,2,6,6-tetramethyl-4-piperidinyl)-n-butylamine (the molar ratio of cyanuric chloride to N-(2,2,6,6-tetramethyl-4-piperidinyl)-n-butylamine was 1:1) is added and the mixture was stirred for 1 h, followed by adding 37 g of dodecylamine (the molar ratio of cyanuric chloride to dodecylamine was 1:1), the mixture was stirred at 60° C. for 3 h, then 50 g of a sodium hydroxide aqueous solution (30%) was added, the mixture was stirred for 3 h, the phases were separated, and finally 17.5 g of morpholine (the molar ratio of cyanuric chloride to morpholine was 1:1) was added, and the mixture was heated up to 110° C., and continuously stirred for 6 h. After the reaction was completed, the phases were separated and the organic phase was washed several times with water, and then the organic phase was separated and concentrated under reduced pressure to obtain 116.1 g of an intermediate 1.

Intermediate 1

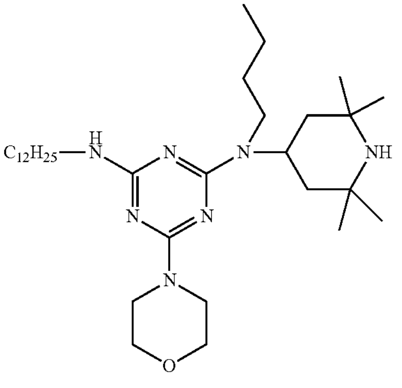

(2) 86 g of the intermediate 1 and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 72 g of the target product.

Molecular weight: 1800 (Mn)

Dynamic viscosity (140° C.): 532 mPas

Example 7

(1) 36.9 g of cyanuric chloride was dissolved in 300 mL xylene, and cooled to 10° C., 42.4 g of N-(2,2,6,6-tetramethyl-4-piperidinyl)-n-butylamine (the molar ratio of cyanuric chloride to N-(2,2,6,6-tetramethyl-4-piperidinyl)-n-butylamine was 1:1) was added and the mixture was stirred for 1 h, then 50 g of a sodium hydroxide aqueous solution (30%) was added, the mixture was stirred for 3 h, the phases were separated, then 74 g of dodecylamine (the molar ratio of cyanuric chloride to dodecylamine was 1:2) was added, and the mixture was heated up to 100° C., and continuously stirred for 6 h. After the reaction was completed, the phases were separated and the organic phase was washed several times with water, and then the organic phase was separated and concentrated under reduced pressure to obtain 134 g of an intermediate 2.

Intermediate 2

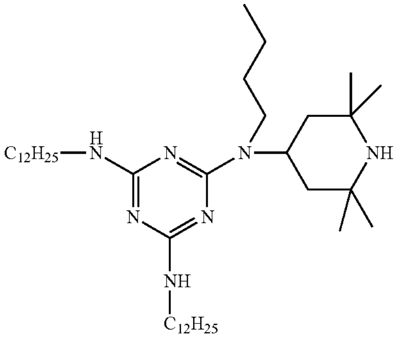

(2) 98 g of the intermediate 2 and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 85 g of the target product.

Molecular weight: 1863 (Mn)

Dynamic viscosity (140° C.): 650 mPas

Example 8

(1) 36.9 g of cyanuric chloride was dissolved in 300 mL xylene, and cooled to 20° C., 84.8 g of N-(2,2,6,6-tetramethyl-4-piperidinyl)-n-butylamine (the molar ratio of cyanuric chloride to N-(2,2,6,6-tetramethyl-4-piperidinyl)-n-butylamine was 1:2) was added and the mixture was stirred for 1 h, then 50 g of a sodium hydroxide aqueous solution (30%) was added, the mixture was stirred for 3 h, the phases were separated, then 37 g of dodecylamine (the molar ratio of cyanuric chloride to dodecylamine is 1:1) was added, and the mixture was heated up to 100° C., and continuously stirred for 6 h. After the reaction was completed, the phases were separated and the organic phase was washed several times with water, and then the organic phase was separated and concentrated under reduced pressure to obtain 140.2 g of an intermediate 3.

Intermediate 3

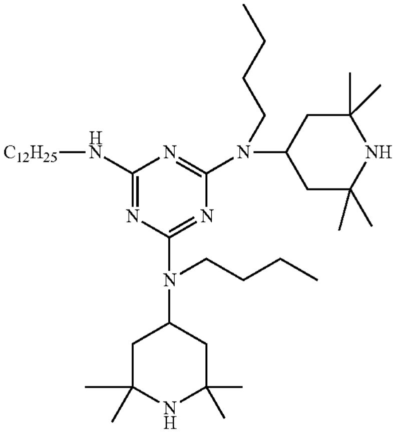

(2) 102.6 g of the intermediate 3 and 3 g of molybdenum trioxide were dissolved in 400 mL chlorobenzene, and heated to 120° C., then 60 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 95 g of the target product.

Molecular weight: 1950 (Mn)

Dynamic viscosity (140° C.): 693 mPas

Example 9

88 g of 2,2,4,4-tetramethyl-4-piperidinyldodecylamide and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 75 g of the target product.

Molecular weight: 1873 (Mn)

Dynamic viscosity (140° C.): 337 mPas

Example 10

150.5 g of 2,2,4,4-tetramethyl-20-lauryloxycarbonylethyl-7-oxa-3,20-triazabisspiro[5.1.11.2]heneicosane-21-on e and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 135.7 g of the target product.

Molecular weight: 1815 (Mn)

Dynamic viscosity (140° C.): 527 mPas

Example 11

90 g of 2,2,4,4-tetramethyl-7-oxa-3,20-triazabisspiro [5.1.11.2]heneicosane-21-one and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 78 g of the target product.

Molecular weight: 1835 (Mn)

Dynamic viscosity (140° C.): 417 mPas

Example 12

101.5 g of 3-dodecyl-1-(2,2,6,6-tetramethyl-4-piperidyl) pyrrolidine-2,5-dione and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 90 g of the target product.

Molecular weight: 1932 (Mn)

Dynamic viscosity (140° C.): 384 mPas

Example 13

32.4 g of 2,2,6,6-tetramethyl-4-piperidinedodecylamine, 42.3 g of 2,2,6,6-tetramethyl-4-piperidinyl stearate and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 67 g of the target product.

Molecular weight: 2054 (Mn)

Dynamic viscosity (140° C.): 243 mPas

Example 14

57.5 g of the intermediate 1, 68.4 g of the intermediate 3 and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 108 g of the target product.

Molecular weight: 2628 (Mn)

Dynamic viscosity (140° C.): 983 mPas

Example 15

32.4 g of 2,2,6,6-tetramethyl-4-piperidinedodecylamine, 42.3 g of 2,2,6,6-tetramethyl-4-piperidinyl stearate, 57.5 g of the intermediate 1 and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 110 g of the target product.

Molecular weight: 2207 (Mn)

Dynamic viscosity (140° C.): 413 mPas

Example 16

81 g of 2,2,6,6-tetramethyl-4-piperidinedodecylamine and 3 g of molybdenum trioxide were dissolved in 400 mL chlorobenzene, and heated to 140° C., then 50 g of tert-butyl hydroperoxide (a 70% aqueous solution) was slowly added dropwise, and the mixture was stirred continuously for 60 h. After the reaction was completed, excess saturated sodium sulfite solution was added, and the mixture was stirred, subjected to phase separation, and filtered, and the organic phase was concentrated to obtain 75 g of an intermediate 4.

60 g of the intermediate 4 and 32.3 g of di-n-butylamine were dissolved in 400 mL chlorobenzene, and heated to 140° C., and stirred continuously for 60 h. After the reaction was completed, the organic phase was concentrated to obtain 85 g of the target product.

Molecular weight: 2286 (Mn)

Dynamic viscosity (140° C.): 271 mPas

Example 17 Experiment of Stabilizing Polypropylene Materials

Basic formulation:

Standard polymer: 79.8 wt % of thermoplastic polypropylene; 20 wt % of hydrotalcite; and 0.20 wt % of an antioxidant (AO-1010);

1 #was 100 wt % of the standard polymer;

2 #was 99.7 wt % of the standard polymer, and 0.3 wt % of sterically hindered amine (Example 3);

3 #was 99.7 wt % of the standard polymer, and 0.3 wt % of sterically hindered amine (Example 5);

4 #was 99.7 wt % of the standard polymer, and 0.3 wt % of sterically hindered amine (Example 6);

5 #was 99.7 wt % of the standard polymer, and 0.3 wt % of sterically hindered amine (Example 8);

6 #was 99.7 wt % of the standard polymer, 0.3 wt % of the sterically hindered amine (Example 13);

7 #was 99.7 wt % of the standard polymer, and 0.4 wt % of sterically hindered amine (Example 14);

8 #was 99.7 wt % of the standard polymer, and 0.3 wt % of sterically hindered amine (Example 15);

Preparation of Test Samples:

The components were mixed in advance in a mixer, and then extruded and pelletized on a twin-screw extruder at 220° C. The pelletized materials were dried at 80° C. for 8 h, and then injection-molded at 240° C. by using an injection molding machine. Finally, the samples were subjected to the xenon lamp aging test according to the SAE J 2527 standard. The test results were shown in Table 1:

TABLE 1

| ΔE* of samples after xenon lamp aging (low value required) | | | | | |
|---|---|---|---|---|---|
| | ΔE* at different aging times | | | | |
| Sample | 0 | 500 h | 1000 h | 1500 h | 2000 h |
| 1# | 0 | 10.5 | 14.3 | — | — |
| 2# | 0 | 0.31 | 0.95 | 1.41 | 1.84 |
| 3# | 0 | 0.37 | 0.98 | 1.37 | 1.83 |
| 4# | 0 | 0.42 | 1.03 | 1.32 | 1.76 |
| 5# | 0 | 0.29 | 0.81 | 1.12 | 1.69 |
| 6# | 0 | 0.32 | 0.96 | 1.40 | 1.84 |
| 7# | 0 | 0.30 | 0.93 | 1.21 | 1.72 |
| 8# | 0 | 0.31 | 0.94 | 1.35 | 1.80 |

Example 18 Test of Stabilizing Thermoplastic Polyethylene

Basic formulation:

Standard polymer: 79.8 wt % of thermoplastic polyethylene; 20 wt % of calcium carbonate; and 0.20 wt % of an antioxidant (AO-1010);

1 #was 100 wt % of the standard polymer;

2 #was 99.6 wt % of the standard polymer, and 0.4 wt % of sterically hindered amine (Example 3);

3 #was 99.6 wt % of the standard polymer, and 0.4 wt % of sterically hindered amine (Example 5);

4 #was 99.6 wt % of the standard polymer, and 0.4 wt % of sterically hindered amine (Example 6);

5 #was 99.6 wt % of the standard polymer, and 0.4 wt % of sterically hindered amine (Example 8);

6 #was 99.6 wt % of the standard polymer, and 0.4 wt % of sterically hindered amine (Example 13);

7 #was 99.6 wt % of the standard polymer, and 0.4 wt % of sterically hindered amine (Example 14);

8 #was 99.6 wt % of the standard polymer, and 0.4 wt % of sterically hindered amine (Example 15);

Preparation of Test Samples:

The components were mixed in advance in a mixer, and then extruded and pelletized on a twin-screw extruder at 190° C. The pelletized materials were dried at 80° C. for 8 h, and then blow-molded at 200° C. by using a blown film machine. Finally, the samples were subjected to an artificial accelerated aging test of xenon lamps in accordance with GB/T 16422.2-2014. The test results were shown in Table 2:

TABLE 2

| % Retention rate of tensile strength | | | | | |
|---|---|---|---|---|---|
| | Retention rate of tensile strength | | | | |
| Sample | 0 | 300 h | 600 h | 1200 h | 1800 h |
| 1# | 100% | 90% | 75% | 45% | — |
| 2# | 100% | 93% | 89% | 74% | 53% |
| 3# | 100% | 92% | 89% | 75% | 52% |
| 4# | 100% | 93% | 88% | 80% | 65% |
| 5# | 100% | 95% | 90% | 83% | 75% |
| 6# | 100% | 92% | 88% | 75% | 52% |
| 7# | 100% | 94% | 90% | 81% | 72% |
| 8# | 100% | 93% | 89% | 81% | 70% |

Example 19 Test of Stabilizing Thermoplastic Polyvinylchloride

Basic Formulation:

Standard Polymer:

65.5 wt % of thermoplastic polyvinyl chloride; 31.5 wt % of a plasticizer; 1.6 wt % of epoxy soybean oil; and 1.4 wt % of a calcium-zinc stabilizer;

1 #was 100 wt % of the standard polymer;

2 #was 99.5 wt % of the standard polymer, 0.25 wt % of UV-531, and 0.25 wt % of sterically hindered amine (Example 3);

3 #was 99.5 wt % of the standard polymer, 0.25 wt % of UV-531, and 0.25 wt % of sterically hindered amine (Example 5);

4 #was 99.5 wt % of the standard polymer, 0.25 wt % of UV-531, and 0.25 wt % of sterically hindered amine (Example 6);

5 #was 99.5 wt % of the standard polymer, 0.25 wt % of UV-531, and 0.25 wt % of sterically hindered amine (Example 8);

Preparation of Test Samples:

The components were mixed in advance in a mixer, and then mixed on a double-roll mill at 165° C. for 7 minutes to obtain the required samples. Finally, the samples were subjected to an xenon lamp aging test according to GB/T 16422.2-2014. The test results were shown in Table 3:

TABLE 3

| % Retention rate of elongation at break | | | | |
|---|---|---|---|---|
| | % Retention rate of elongation at break | | | |
| Sample | 0 | 200 h | 800 h | 1200 h |
| 1# | 100% | 82% | 60% | 45% |
| 2# | 100% | 90% | 74% | 65% |
| 3# | 100% | 91% | 72% | 64% |
| 4# | 100% | 90% | 78% | 70% |
| 5# | 100% | 95% | 88% | 81% |

Example 20 Test of Stabilizing Thermoplastic Polyamide 6

Basic formulation:

Standard polymer: 79.8 wt % of thermoplastic polyamide 6; 20 wt % of calcium carbonate; and 0.20 wt % of an antioxidant (AO-1098);

1 #was 100 wt % of the standard polymer;

2 #was 99.6 wt % of the standard polymer, and 0.4 wt % of sterically hindered amine (Example 3);

3 #was 99.6 wt % of the standard polymer, and 0.4 wt % of sterically hindered amine (Example 9);

4 #was 99.6 wt % of the standard polymer, and 0.4 wt % of sterically hindered amine (Example 10);

5 #was 99.6 wt % of the standard polymer, and 0.4 wt % of sterically hindered amine (Example 11);

6 #was 99.6 wt % of the standard polymer, and 0.4 wt % of sterically hindered amine (Example 12);

Preparation of Test Samples:

The components were mixed in advance in a mixer, and then extruded and pelletized on a twin-screw extruder at 260° C., dried at 80° C. for 12 h, and then injection molded at 265° C. by using an injection molding machine. Finally, the samples were subjected to the xenon lamp aging test according to the standard GB/T 16422.2-2014. The test results were shown in Table 4:

TABLE 4

| ΔE* of samples after xenon lamp aging (low value required) | | | | | |
|---|---|---|---|---|---|
| | ΔE* at different aging times | | | | |
| Sample | 0 | 300 h | 600 h | 1200 h | 1800 h |
| 1# | 0 | 3.12 | 8.54 | 16.32 | 26.73 |
| 2# | 0 | 2.85 | 7.32 | 14.11 | 23.58 |
| 3# | 0 | 1.13 | 3.05 | 7.67 | 11.64 |
| 4# | 0 | 1.05 | 2.95 | 7.53 | 11.48 |
| 5# | 0 | 1.25 | 3.37 | 8.01 | 12.32 |
| 6# | 0 | 1.32 | 3.43 | 8.02 | 12.35 |

Example 21 Performance Test of Using as Flame Retardant in PP Film

Basic formulation:

Standard polymer: 99.65 wt % of thermoplastic polypropylene; 0.05 wt % of calcium stearate; and 0.30 wt % of an antioxidant (AO-1010:AO-168=1:1);

1 #was 100 wt % of the standard polymer;

2 #was 99.6 wt % of the standard polymer, and 0.4 wt % of sterically hindered amine (Example 3);

3 #was 99.6 wt % of the standard polymer, and 0.4 wt % of sterically hindered amine (Example 5);

4 #was 99.6 wt % of the standard polymer, and 0.4 wt % of sterically hindered amine (Example 6);

5 #was 99.6 wt % of the standard polymer, and 0.4 wt % of sterically hindered amine (Example 8);

Preparation of Test Samples:

The components were mixed in advance in a mixer, and then extruded and pelletized on a twin-screw extruder at 220° C. The pelletized materials were dried at 80° C. for 8 h, and then subjected to compression molding in a hot press for preparation. Finally, the samples were tested for flame retardancy according to DIN 4102-B2. The test results were shown in Table 5:

TABLE 5

| Sample flame retardant performance | | | | |
|---|---|---|---|---|
| Sample | Weight loss/% | Flame length/mm | Flame drops | Pass/fail |
| 1# | 100 | 190 | Yes | Fail |
| 2# | 8.5 | 104 | Yes | Pass |
| 3# | 8.4 | 102 | Yes | Pass |
| 4# | 8.7 | 105 | Yes | Pass |
| 5# | 6.5 | 87 | Yes | Pass |

Example 22 Performance Test of Using as Flame Retardant in Polyamide 6

Basic formulation: Standard polymer: 79.8 wt % of thermoplastic polyamide 6; 20 wt % of calcium carbonate; and 0.20 wt % of an antioxidant (AO-1098);

1 #was 100 wt % of the standard polymer;

2 #was 99.6 wt % of the standard polymer, and 0.4 wt % of sterically hindered amine (Example 3);

3 #was 99.6 wt % of the standard polymer, and 0.4 wt % of sterically hindered amine (Example 9);

4 #was 99.6 wt % of the standard polymer, and 0.4 wt % of sterically hindered amine (Example 10);

5 #was 99.6 wt % of the standard polymer, and 0.4 wt % of sterically hindered amine (Example 11);

6 #was 99.6 wt % of the standard polymer, and 0.4 wt % of sterically hindered amine (Example 12);

Preparation of Test Samples:

The components were mixed in advance in a mixer, and then extruded and pelletized on a twin-screw extruder at 260° C. The pelletized materials were dried at 80° C. for 12 h, and then injection molded at 265° C. by using an injection molding machine. Finally, the samples were tested for flame retardancy according to UL94. The test results were shown in Table 6:

TABLE 6

| Sample flame retardant performance | | |
|---|---|---|
| Sample | V level | Flame drops |
| 1# | 2 | Yes |
| 2# | 2 | Yes |
| 3# | 1 | No |
| 4# | 1 | No |
| 5# | 1 | No |
| 6# | 1 | No |

In the end, it should be noted that the above examples are only used to illustrate the technical solution of the present invention, rather than limiting the present invention; although the present invention has been described in detail with reference to the foregoing examples, those of common skillers in the art will understand: they can still modify the technical solutions described in the foregoing examples or replace some or all of the technical features equivalently; and these modifications or replacements do not deviate the essence of the corresponding technical solutions from the scope of the technical solutions of examples in the present invention.

The invention claimed is:

1. A polymerized high-molecular-weight sterically hindered amine, wherein the polymerized high-molecular-weight sterically hindered amine is selected from the following structures:

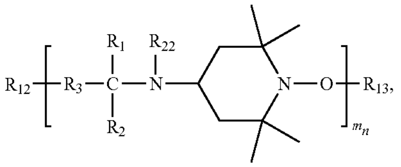

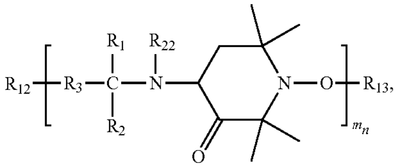

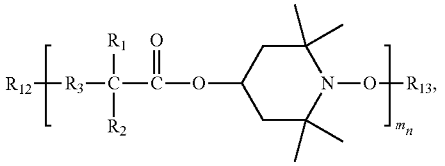

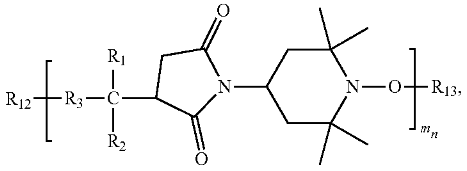

-continued
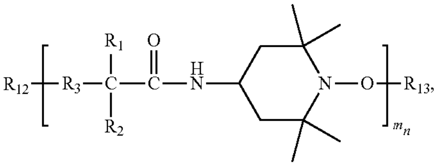
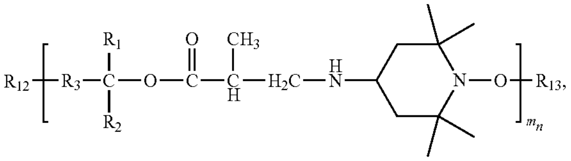
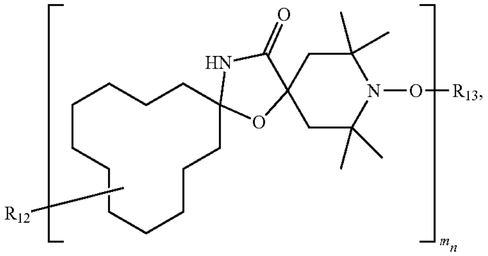
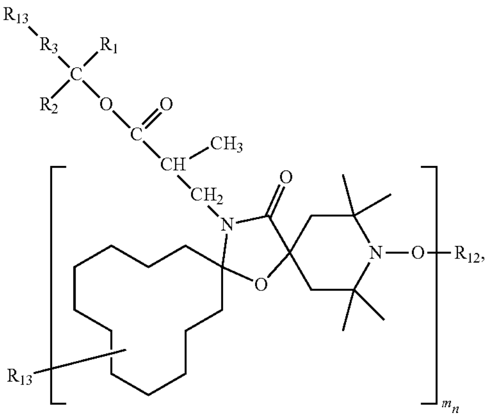
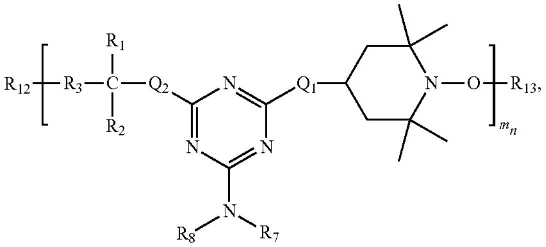
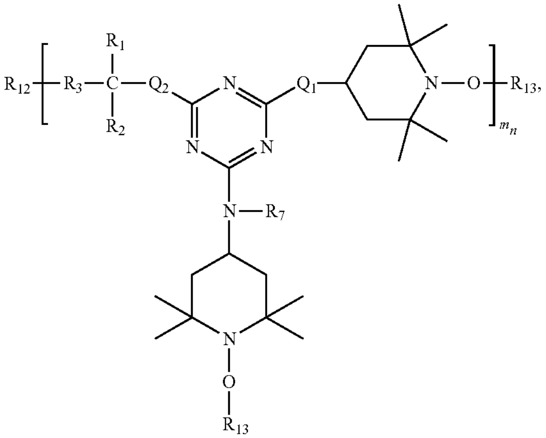
-continued
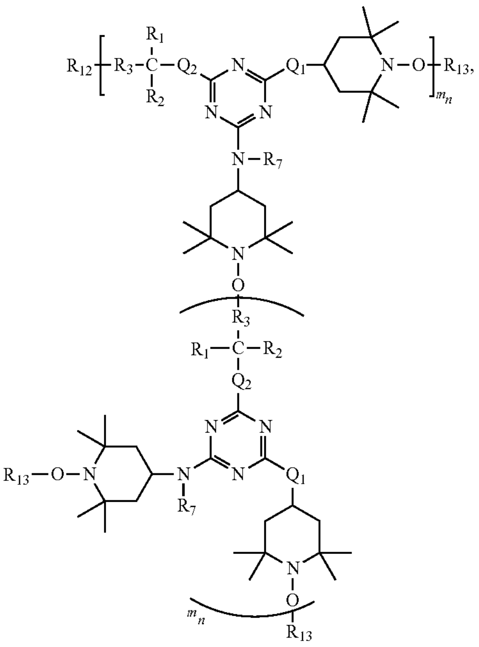
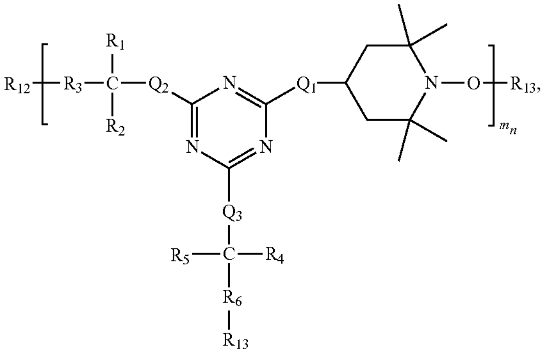
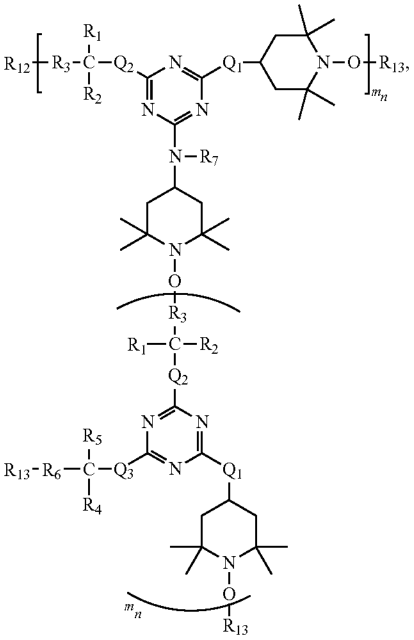

-continued

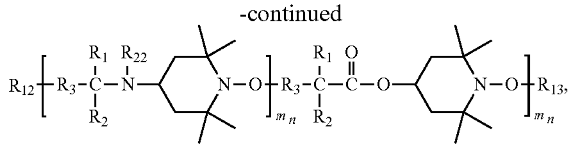

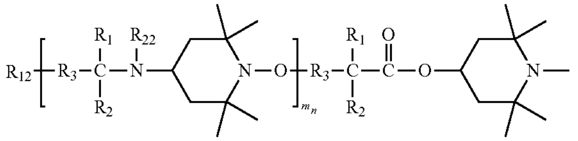

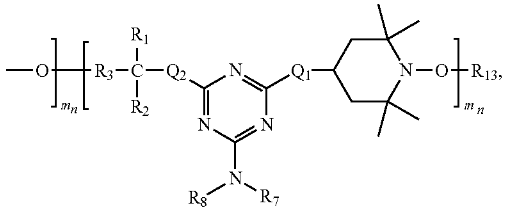

and

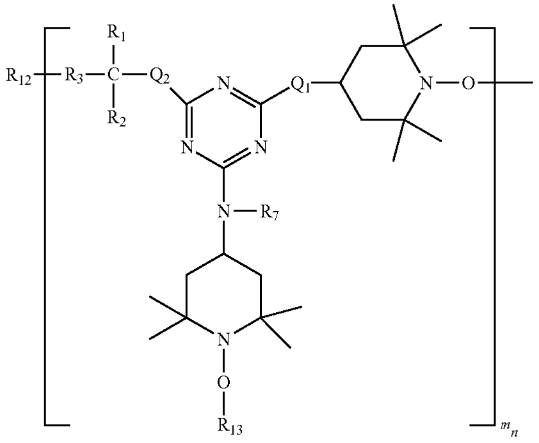

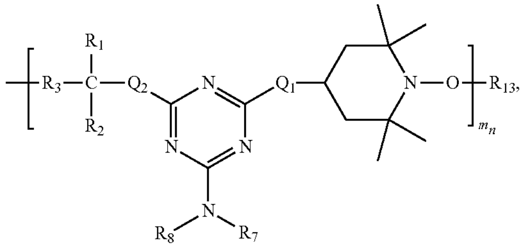

$m_n$ is an integer between 2-20;

$Q_1$, $Q_2$ and $Q_3$ are independently selected from —O—, —CO—O—, —CO—$NR_{22}$— or —$NR_{22}$—; $R_{22}$ is independently selected from hydrogen and $C_1$-$C_{20}$ alkyl;

$R_1$ and $R_2$ are independently selected from hydrogen, and $C_1$-$C_{40}$ alkyl, wherein any one or more of the H atoms in the alkyl can be substituted with —$R_{21}$, —$OR_{21}$, —$COOR_{21}$ or —$COR_{21}$; $R_3$ is selected from $C_1$-$C_{40}$ alkylene, wherein any one or more of the H atoms in the alkylene can be substituted with —$R_{21}$, —$OR_{21}$, —$COOR_{21}$ or —$COR_{21}$; the total number of carbon atoms in —$R_1$, $R_2$ and $R_3$ is 40 or less;

$R_7$ and $R_8$ are independently selected from hydrogen, unsubstituted $C_1$-$C_{20}$ alkyl or $C_1$-$C_{20}$ alkyl substituted with —$R_{21}$; or, $R_7$, $R_8$ and the N atom between $R_7$ and $R_8$ form unsubstituted $C_3$-$C_{12}$ cycloalkylene or $C_2$-$C_{12}$ heterocycloalkylene;

$R_4$ and $R_5$ are independently selected from hydrogen, and $C_1$-$C_{40}$ alkyl, wherein any one or more of the H atoms in the alkyl can be substituted with —$R_{21}$, —$OR_{21}$, —$COOR_{21}$ or —$COR_{21}$; $R_6$ is selected from $C_1$-$C_{40}$ alkylene, wherein any one or more of the H atoms in the alkylene can be substituted with —$R_{21}$, —$OR_{21}$, —$COOR_{21}$ or —$COR_{21}$; and the total number of carbon atoms in —$R_4$, $R_5$ and $R_6$ is 40 or less; and $R_{12}$ and $R_{13}$ are independently selected from hydrogen, unsubstituted $C_4$-$C_{30}$ alkyl or $C_4$-$C_{30}$ alkyl wherein any one or more of the H atoms in the alkyl can be subsiitute with hydroxyl, —$NO_2$, halogen, amino, cyano, —$R_{21}$, —$OR_{21}$, —$COOOR_{21}$, —$COR_{21}$ or $C_1$-$C_{10}$ alkyl, $R_{21}$ is selected from $C_1$-$C_{20}$ alkyl.

2. The polymerized high-molecular-weight sterically hindered amine according to claim 1, wherein —$R_{21}$ is selected from $C_1$-$C_{12}$ alkyl;

$Q_1$ and $Q_2$ are independently selected from —CO—O—, —CO—$NR_{22}$— or —$NR_{22}$—;

—$R_{22}$ is selected from hydrogen, and $C_1$-$C_{12}$ alkyl;

—$R_7$ and $R_8$ are independently selected from unsubstituted $C_1$-$C_{20}$ alkyl; or, $R_7$, $R_8$ and the N atom between $R_7$ and $R_8$ form unsubstituted $C_3$-$C_{10}$ cycloalkylene or $C_2$-$C_8$ oxo-cycloalkylene; and $Q_3$ is selected from —$NR_{22}$—.

3. The polymerized high-molecular-weight sterically hindered amine according to claim 1, wherein $R_1$ and $R_2$ are independently selected from hydrogen or $C_1$-$C_{40}$ alkyl; $R_3$ is selected from $C_1$-$C_{40}$ alkylene; the total number of carbon atoms in $R_1$, $R_2$ and $R_3$ is 40 or less;

$R_{22}$ is selected from $C_1$-$C_5$ alkyl;

$R_7$ and $R_8$ are independently selected from $C_1$-$C_{10}$ alkylene or $R_7$, $R_8$ and the N atom between $R_7$ and $R_8$ form $C_3$-$C_{10}$ cycloalkylene and $C_2$-$C_8$ oxo-cycloalkylene;

$R_4$ and $R_5$ are independently selected from hydrogen or $C_1$-$C_{40}$ alkyl; $R_6$ is selected from $C_1$-$C_{40}$ alkylene; the total number of carbon atoms in $R_4$, $R_5$ and $R_6$ is 40 or less; and $Q_1$, $Q_2$ and $Q_3$ are independently selected from —CO—O—, —CO—$NR_{22}$— or —$NR_{22}$—, and $R_{22}$ is selected from $C_1$-$C_5$ alkyl.

4. A method for preparing the polymerized high-molecular-weight sterically hindered amine of claim 1, including the steps of dissolving a polymerizable monomer in a solvent or heating a polymerizable monomer to a molten state, adding a catalyst and hydroperoxide in sequence, and carrying out a reaction to generate the polymerized high-molecular-weight sterically hindered amine wherein the polymerizable monomer has a general formula as follows:

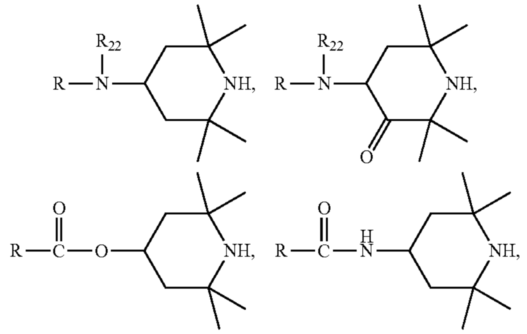

-continued

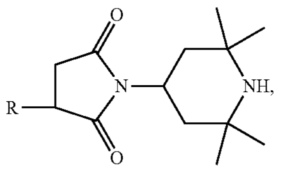

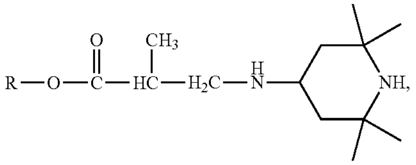

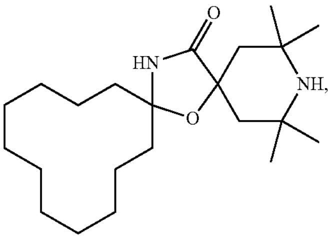

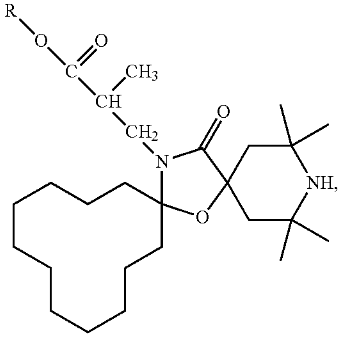

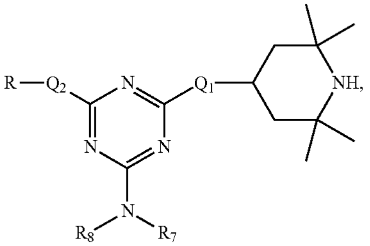

-continued

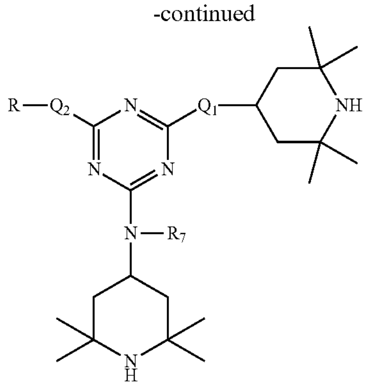

or

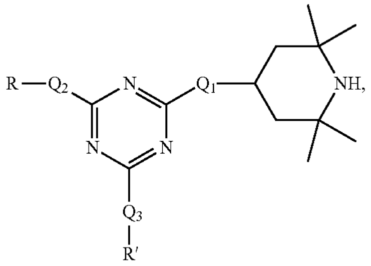

wherein

R and R' can be the same or different, and are selected from $C_1$-$C_{50}$ alkyl, $C_3$-$C_{12}$ cycloalkyl, and $C_2$-$C_{12}$ heterocycloalkyl, wherein the any one or more of the H atoms in the alkyl, cycloalkyl, or heterocycloalkyl can be substituted with hydroxyl, $NO_2$, halogen, amino, cyano, $—R_{21}$, $—OR_{21}$, $—COOR_{21}$ or $—COR_{21}$, and the hetero atom in the heterocyclic ring is selected from oxygen, nitrogen, sulfur, phosphorus or silicon; and the total number of carbon atoms in R and R' is 50 or less;

the solvent is dichlorobenzene, chlorobenzene, toluene, halogenated hydrocarbons, methanol, ethanol, ethylene glycol, methyl ether or water;

the catalyst is a metal compound, wherein the metal in the metal compound is selected from IVb, B Vb, VIb, VIIb and VIII metal elements in the periodic table; and the hydroperoxide is an inorganic hydroperoxide or an organic hydroperoxide, the inorganic or an aryl hydroperoxide is $H_2O_2$; the organic hydroperoxide is an alkyl hydroperoxide or an aryl hydroperoxide.

5. A composition, comprising one or two or more organic substances sensitive to light, heat or oxidation and at least one polymerized high-molecular-weight sterically hindered amine according to claim 1.

6. A method for preparing the polymerized high-molecular-weight sterically hindered amine according to claim 4, wherein the catalyst is one or more selected from the group consisting of vanadiumoxy acetylacetonate, vanadium (III) acetylacetonate, cobalt carbonyl, chromium (VI) oxide, n-butyl titanate, isopropyl titanate, hexacarbonyl molybdenum, molybdenum trioxide, vanadium pentoxide, chromium trioxide and tungsten trioxide.

* * * * *